United States Patent
Kim et al.

(10) Patent No.: US 12,352,589 B2
(45) Date of Patent: Jul. 8, 2025

(54) DEVICE FOR EXTRACTING OPERATION INFORMATION ABOUT CONNECTED CAR ON BASIS OF ONBOARD DIAGNOSTIC DATA, AND METHOD THEREFOR

(71) Applicant: KOREA ELECTRONICS TECHNOLOGY INSTITUTE, Seongnam-si (KR)

(72) Inventors: Changwoo Kim, Siheung-si (KR); Hyosub Choi, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 152 days.

(21) Appl. No.: 18/251,835

(22) PCT Filed: Nov. 18, 2020

(86) PCT No.: PCT/KR2020/016223
§ 371 (c)(1),
(2) Date: May 4, 2023

(87) PCT Pub. No.: WO2022/097809
PCT Pub. Date: May 12, 2022

(65) Prior Publication Data
US 2024/0011784 A1    Jan. 11, 2024

(30) Foreign Application Priority Data
Nov. 5, 2020  (KR) .......................... 10-2020-0146646

(51) Int. Cl.
*G01C 21/34*    (2006.01)
(52) U.S. Cl.
CPC ..... *G01C 21/3492* (2013.01); *G01C 21/3461* (2013.01)
(58) Field of Classification Search
CPC .................. G01C 21/3492; G01C 21/3461
See application file for complete search history.

(56) References Cited

U.S. PATENT DOCUMENTS

| | | | |
|---|---|---|---|
| 2014/0040434 A1* | 2/2014 | Rybak | G07C 5/085 709/219 |
| 2016/0252360 A1* | 9/2016 | Annapureddy | H04W 4/024 701/428 |
| 2017/0103588 A1* | 4/2017 | Rajani | G06N 5/04 |

FOREIGN PATENT DOCUMENTS

| | | |
|---|---|---|
| KR | 10-2011-0010289 A | 2/2011 |
| KR | 10-2014-0006689 A | 1/2014 |

(Continued)

OTHER PUBLICATIONS

International Search Report mailed Jul. 28, 2021 in International Application No. PCT/KR2020/016223.

(Continued)

*Primary Examiner* — Adnan M Mirza
(74) *Attorney, Agent, or Firm* — Knobbe, Martens, Olson & Bear, LLP (57) ABSTRACT

A device for extracting operation information about a connected car is proposed. The device may include an outlier remover removing outliers from speed data in which the speed of a vehicle is measured at every predetermined time interval and stored, and from accumulated travel section data in which the section traveled by the vehicle is accumulatively stored at every predetermined time interval; The device may also include a travel section extractor extracting the section in which the vehicle has traveled, based on the speed data and the accumulated travel section data from which the outliers were removed. The device may further include a stop section extractor extracting a stop section in which the vehicle has stopped; and a pure travel section extractor extracting, as a pure travel section, a section in which the stop section present in the travel section is excluded from the travel section.

5 Claims, 9 Drawing Sheets

(56) References Cited

FOREIGN PATENT DOCUMENTS

| | | |
|---|---|---|
| KR | 10-1423138 B1 | 7/2014 |
| KR | 10-2016-0124044 A | 10/2016 |
| KR | 10-2018-0111291 A | 10/2018 |
| KR | 10-1968983 B1 | 8/2019 |
| KR | 10-2070752 B1 | 1/2020 |

OTHER PUBLICATIONS

Office Action dated Apr. 20, 2022 in Korean Application No. 10-2020-0146646.

Kim et al., "A method for extracting industrial connected vehicle driving section based on vehicle OBD-II data", 2020, KETI Intelligence Integrated Software Research Center.

Kim et al., "S/W design for conditional combination search of time series data", 2020, Korea Electronics Technology Institute.

\* cited by examiner

DEVICE FOR EXTRACTING OPERATION INFORMATION ABOUT CONNECTED CAR ON BASIS OF ONBOARD DIAGNOSTIC DATA, AND METHOD THEREFOR

TECHNICAL FIELD

The present invention relates in general to an operation information extraction technology. Particularly, the present invention relates to a device and method for extracting operation information, such as a travel section, a stop section, and a parking section, of a connected car based on on-board diagnostic data.

BACKGROUND ART

Vehicle sensor big data is mainly collected from on-board diagnostics (OBD-II) attached to the vehicle through a wireless network. However, missing values or outliers may occur during data transmission process, which may cause problems in data processing and also reduce the accuracy of processed data. Moreover, the vehicle subject to vehicle big data analysis has different attributes depending on its travel, stop, or parking state. However, if data are collected without such classification, the accuracy of analysis, such as detailed classification, may be somewhat lowered.

DISCLOSURE

Technical Problem

The present invention is intended to provide a device and method for extracting operation information of a connected car based on on-board diagnostic data.

Technical Solution

According to an embodiment of the present invention, a device for extracting operation information of a connected car includes an outlier remover removing outliers from speed data obtained by measuring a speed of a vehicle at predetermined time intervals and from accumulated travel section data obtained by accumulating a travel section of the vehicle at predetermined time intervals, a travel section extractor extracting the travel section of the vehicle based on the speed data and the accumulated travel section data from which the outliers are removed by the outlier remover, a stop section extractor extracting a stop section in which the vehicle is stopped, and a pure travel section extractor extracting a pure travel section which is obtained by excluding the stop section existing in the travel section from the travel section.

The outlier remover includes a speed outlier remover that determines and removes speed data outside a speed range of the vehicle as the outliers, and an accumulated travel distance outlier remover that derives a travel distance from a difference between two consecutive accumulated travel distances and, if the derived travel distance is out of a maximum travel distance of the vehicle, determines and removes corresponding accumulated travel distance data as the outliers.

The travel section extractor designates a time point at which the speed data begins to exist as a start point of the travel section, and designates a time point at which no speed data begins to exist as an end point of the travel section, wherein when a time from the start point of the travel section to the end point of the travel section is equal to or greater than a predetermined time, and a distance from the start point of the travel section to the end point of the travel section is equal to or greater than a predetermined distance, the travel section is designated as a valid travel section.

The stop section extractor includes at least one of a speed-based stop section extractor that designates, as the stop section, a section where a speed of the vehicle is 0 for a predetermined time or more within the travel section, a GPS-based stop section extractor that designates, as the stop section between start and end points of the travel section, a section where a distance between pieces of location information of the vehicle is continuously within a predetermined distance, and a speed-and-GPS-based stop section extractor that detects the stop section by combining the designated stop section based on the speed and the designated stop section based on the location information.

The device further includes a parking section extractor that searches for speed data from which the outliers are removed, and if an interval between consecutive speed data is a predetermined time or more, extracts a parking section by designating start and end points of the parking section from the interval.

According to an embodiment of the present invention, a method for extracting operation information of a connected car includes, at an outlier remover, removing outliers from speed data obtained by measuring a speed of a vehicle at predetermined time intervals and from accumulated travel section data obtained by accumulating a travel section of the vehicle at predetermined time intervals; at a travel section extractor, extracting the travel section of the vehicle based on the speed data and the accumulated travel section data from which the outliers are removed by the outlier remover; at a stop section extractor, extracting a stop section in which the vehicle is stopped; and at a pure travel section extractor, extracting a pure travel section which is obtained by excluding the stop section existing in the travel section from the travel section.

Advantageous Effects

The present invention makes it possible to classify parking and stop sections only with data that can be collected from on-board diagnostics in all vehicles, which may contribute to minimizing the data volume. In addition, since phenomena such as abnormal signs and failures of the vehicle appear while the vehicle is driving, it is possible to analyze and predict more easily if a travel section of the vehicle is known. The vehicle's route, driving time, and travel distance can be identified through the travel section, and the stop section can be replaced with an idling section and can also be identified as a major base along with the parking section. In addition, it can be applied to analyze and predict the driving pattern or fuel efficiency of the vehicle through the travel section, stop section, and parking section.

MODE FOR DISCLOSURE

The terms and words used in the following description, drawings and claims are not limited to the bibliographical meanings thereof and are merely used by the inventor to enable a clear and consistent understanding of the invention. Thus, it will be apparent to those skilled in the art that the following description about various embodiments of the present invention is provided for illustration purpose only and not for the purpose of limiting the invention as defined by the appended claims and their equivalents.

Now, embodiments of the present invention will be described in detail with reference to the accompanying drawings. In the drawings, like elements are denoted by the same reference numerals. In addition, detailed descriptions of well-known functions and elements that may obscure the subject matter of the present invention will be omitted. For the same reason, some elements in the drawings are exaggerated, omitted, or schematically illustrated, and the size of each element does not entirely reflect the actual size.

Figure 1:
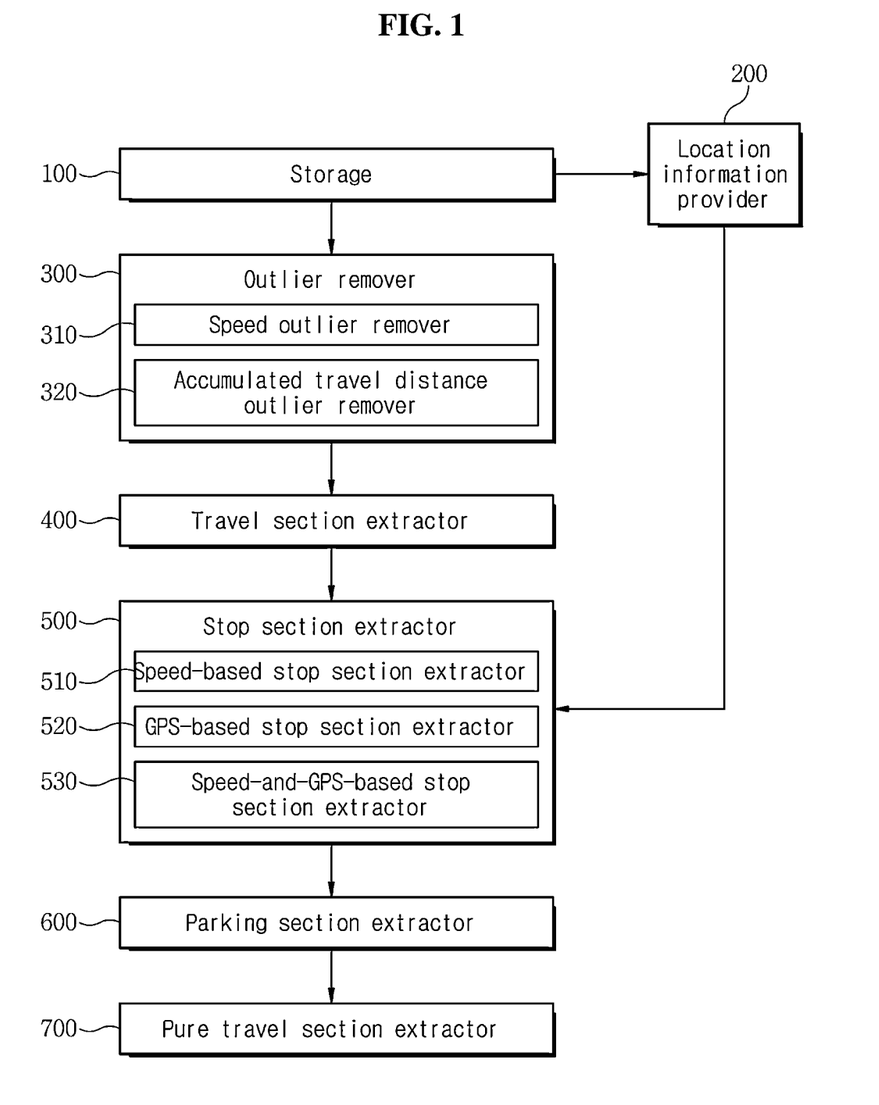
FIG. 1 is a diagram illustrating the configuration of a device for extracting operation information of a connected car based on on-board diagnostic data according to an embodiment of the present invention.

First, a device for extracting operation information of a connected car based on on-board diagnostic data according to an embodiment of the present invention will be described. FIG. 1 is a diagram illustrating the configuration of a device for extracting operation information of a connected car based on on-board diagnostic data according to an embodiment of the present invention.

Referring to FIG. 1, a device for extracting operation information of a connected car based on on-board diagnostic data according to an embodiment of the present invention (hereinafter, referred to as 'operation information extraction device') includes a storage 100, a location information provider 200, an outlier remover 300, a speed outlier remover 310, an accumulated travel distance outlier remover 320, a travel section extractor 400, a stop section extractor 500, a parking section extractor 600, and a pure travel section extractor 700.

The storage 100 is for storing various data according to an embodiment of the present invention. The storage 100 stores source data measured by sensors such as a plurality of inertial sensors and a GPS receiver mounted on the vehicle. The source data includes speed data, accumulated travel distance data, location information data, and the like.

The location information provider 200 extracts location information data and provides it to the stop section extractor 500. The location information data includes latitude and longitude coordinates derived from satellite signals received from GPS satellites.

The outlier remover 300 is for removing outliers from source data. The present invention removes outliers from the source data because the accuracy of processed data may decrease due to the outliers in the source data. The outlier remover 300 removes the outliers from the source data by classifying data according to speed and accumulated travel distance before data processing. To this end, the outlier remover 300 includes a speed outlier remover 310 and an accumulated travel distance outlier remover 320. The speed outlier remover 310 is for removing outliers from speed data among the source data. The accumulated travel distance outlier remover 320 is for removing outliers from the accumulated travel distance data among the source data.

The speed outlier remover 310 determines speed data outside a vehicle speed range (e.g., 0 to 260 km/h) as outliers and removes them.

The accumulated travel distance outlier remover 320 derives a travel distance from a difference between two consecutive accumulated travel distances, and if the derived travel distance is out of the maximum travel distance of the vehicle at the corresponding time, removes it as an outlier.

The travel section extractor 400 is for extracting a travel section based on the speed data from which outliers have been removed and the accumulated travel distance data from which outliers have been removed. In the embodiment of the present invention, the travel section refers to a section from a time point when the vehicle's engine is turned on to a time point when the vehicle's engine is turned off after driving and parking. In addition, the case where driving for more than 10 minutes and for more than 5 km is designated as a valid travel section.

The speed data is measured and generated through a sensor installed in the vehicle after the ignition is turned on. Once the ignition is turned off, the speed data cannot be generated. Therefore, the travel section extractor 400 can obtain start and end points of the travel section by designating a time point at which any speed data begins to exist as the start point of the travel section and also designating a time point at which no speed data begins to exist due to the turned off vehicle's engine as the end point of the travel section. That is, the travel section extractor 400 designates the start point and the end point of the travel section depending on whether or not there is speed data. In addition, the travel section extractor 400 designates the case where the vehicle travels for a predetermined time or more and for a predetermined distance or more as an effective travel section.

The stop section extractor 500 is for extracting a section where the vehicle is stopped. The stop section extractor 500 includes a speed-based stop section extractor 510, a GPS-based stop section extractor 520, and a speed-and-GPS-based stop section extractor 530.

The speed-based stop section extractor 510 designates, as a stop section, a section where the speed is 0 for a predetermined time (e.g., 8 minutes) or more within the travel section.

The GPS-based stop section extractor 520 is for extracting the stop section based on location information. Here, the location information includes latitude and longitude coordinates derived from satellite signals received from GPS satellites. The GPS-based stop section extractor 520 designates, as the stop section between the start and end points of the travel section, a section where a distance between pieces of the location information is continuously within a predetermined distance (e.g., 50 m).

The speed-and-GPS-based stop section extractor 530 generates a stop section by combining the extracted stop section based on speed and the extracted stop section based on location information.

The parking section extractor 600 is for detecting a parking section of the vehicle. In an embodiment of the present invention, the parking section is defined as a section from the time the vehicle's engine is turned off to the time the vehicle's engine is turned on again. In particular, the parking section extractor 600 designates the parking section as an effective parking section when a parking time is longer than a predetermined time (e.g., 2 hours) in order not to detect the parking section as a data missing value. When the engine is turned on, the speed data exists every second. Therefore, the parking section extractor 600 sequentially searches for speed data and, an interval between consecutive speed data is 2 hours or longer, it designates the start and end points of the parking section from the interval.

The pure travel section extractor 700 is for extracting a pure travel section. Since stop sections may be distributed within the travel section, the pure travel section extractor 700 excludes such stop sections from the travel section and designates the remaining section, that is, the travel section excluding the stop section, as the pure travel section.

The pure travel section extractor 700 designates the start point of the travel section and the start point of the first stop section within the travel section as the start and end points of the pure travel section, respectively, designates the end point of one stop section and the start point of the next stop section as the start and end points of the pure travel section, respectively, and designates the end point of the last stop section and the end point of the travel section as the start and end points of the pure travel section, respectively. Specifically, using the travel section data, the pure travel section extractor 700 designates the start point of the travel section as the start point of one pure travel section and designates the start point of the first stop section existing in the travel section as the end point of that pure travel section. In addition, the pure travel section extractor 700 designates the end point of one stop section as the start point of another pure travel section and designates the start point of the next stop section as the end point of that pure travel section. Also, the pure travel section extractor 700 designates the end point of the last stop section as the start point of the last pure travel section and designates the end point of the travel section as the end point of that pure travel section. In this way, all pure travel sections can be extracted from the travel section containing stop sections.

Figure 2:
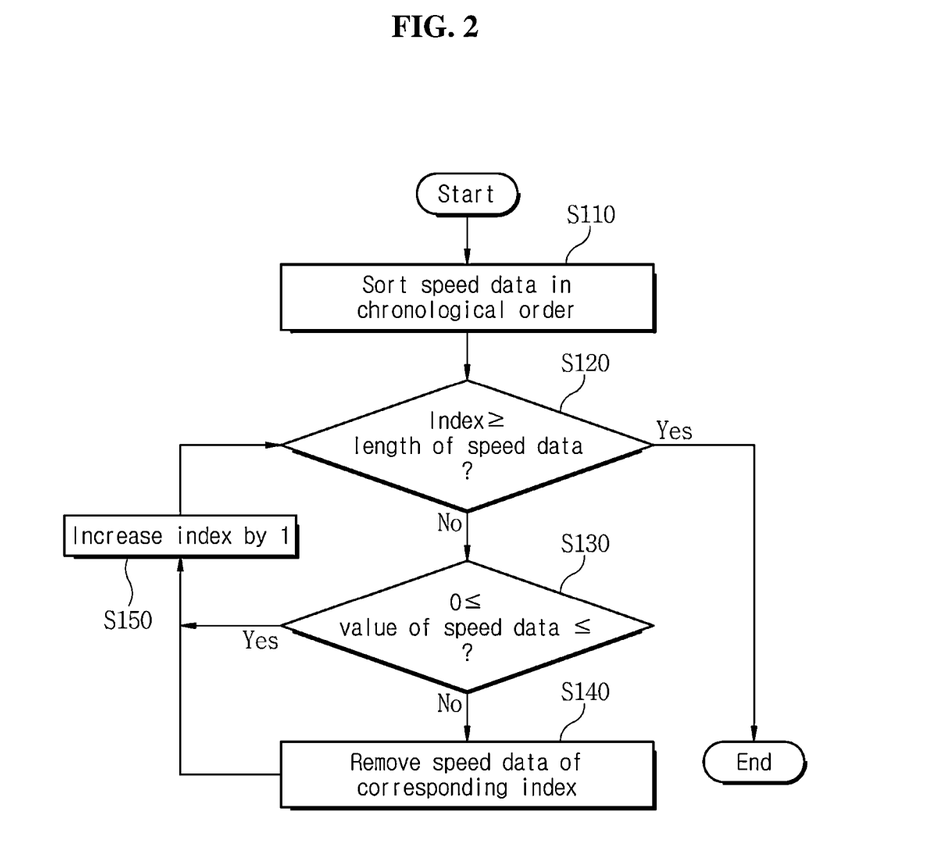
FIG. 2 is a flowchart illustrating a method of removing outliers from speed data at a speed outlier remover according to an embodiment of the present invention.

Next, a method for the speed outlier remover to remove outliers from speed data among source data according to an embodiment of the present invention will be described. FIG. 2 is a flowchart illustrating a method of removing outliers from speed data at a speed outlier remover according to an embodiment of the present invention.

Referring to FIG. 2, speed data is an array of data in the form of {time: value (speed)}. At step S110, the speed outlier remover 310 assigns an index ([index]{time: value}), sorts the speed data in chronological order, and initializes a parameter, that is, the index (i.e., index=0). For example, it is assumed that the speed data is an array of length 12 such as "[0]{t0: 10}, [1]{t1: 20}, [2]{t2: 40}, ..., [10]{t10: 280}, [11]{t11: 80}". Then, at step S120, the speed outlier remover 310 determines whether the index of the speed data is greater than or equal to the length of the speed data.

If the index is less than the length of the speed data, the speed outlier remover 310 determines at step S130 whether the value of the speed data is between 0 and the maximum vehicle speed (e.g., 260 km). If the value of the speed data is less than 0 or exceeds the maximum vehicle speed (e.g., 260 km), the speed outlier remover 310 determines the speed data as an outlier and deletes the speed data of the corresponding index at step S140. For example, in the case of data {t10: 280}, which is the 11th index, it can be removed because it exceeds 260.

On the other hand, if the value of the speed data is between 0 and the maximum vehicle speed (e.g., 260 km), the speed outlier remover 310 increases the index by 1 (index+=1) at step S150.

Then, at step S120, the speed outlier remover 310 determines again whether the increased index of the speed data is greater than or equal to the length of the speed data. If the index of the speed data is smaller than the length of the speed data, the speed anomaly remover 310 repeats steps S130 to S150 described above, and if the index of the speed data is greater than or equal to the length of the speed data, the speed anomaly remover 310 ends the process.

Figure 3:
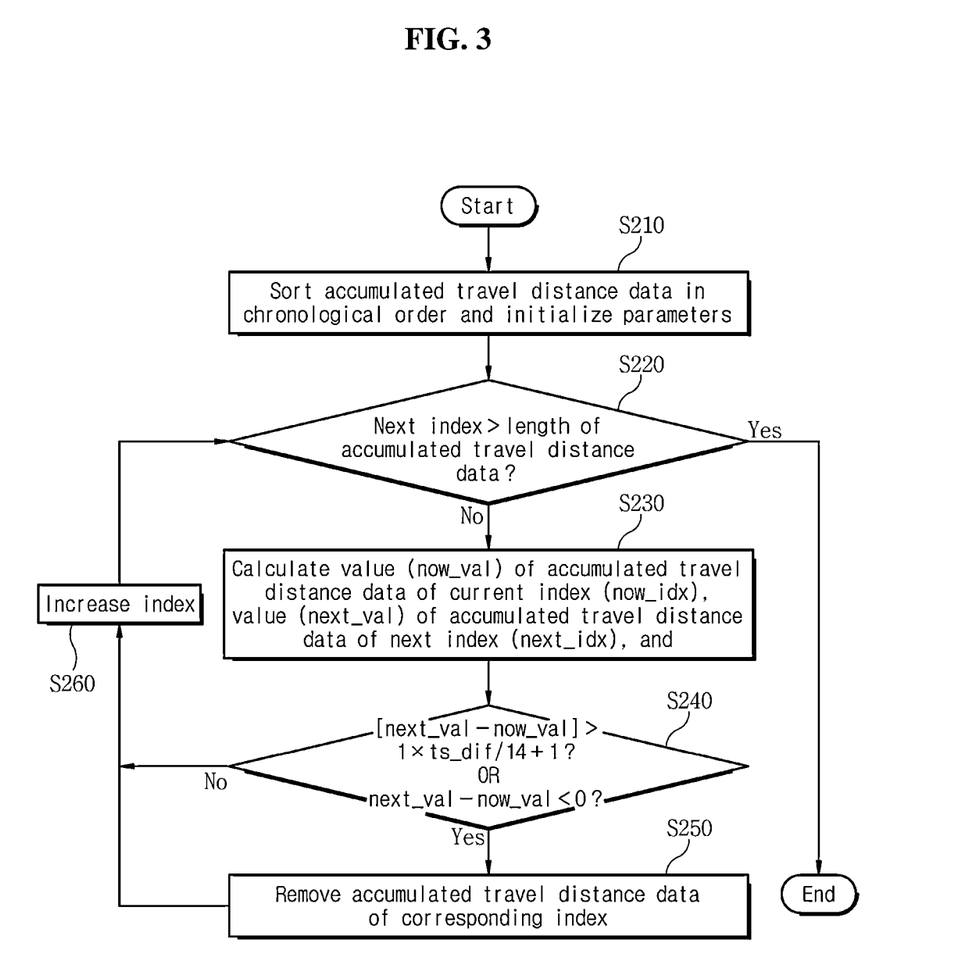
FIG. 3 is a flowchart illustrating a method of removing outliers from accumulated travel distance data at an accumulated travel distance outlier remover according to an embodiment of the present invention.

Next, a method for the accumulated travel distance outlier remover to remove outliers from accumulated travel distance data among source data according to an embodiment of the present invention will be described. FIG. 3 is a flowchart illustrating a method of removing outliers from accumulated travel distance data at an accumulated travel distance outlier remover according to an embodiment of the present invention.

Referring to FIG. 3, accumulated travel distance data is an array of data in the form of {time: value (accumulated travel distance)}. At step S210, the accumulated travel distance outlier remover 320 assigns an index ([index] {time: value}), sorts the accumulated travel distance data in chronological order, and initializes parameters, that is, the current index (now_idx) and the next index (next_idx) (i.e., now_idx=0, next_idx=now_idx+1). For example, it is assumed that the accumulated travel distance data is an array of length 12 such as "[0]{t0: 10}, [1]{t1: 20}, [2]{t2: 40}, ..., [10]{t10: 280}, [11]{al: 80}".

At step S220, the accumulated travel distance outlier remover 320 determines whether the next index (next_idx) is greater than the length of the accumulated travel distance data based on the current accumulated travel distance data.

If the next index (next_idx) is less than or equal to the length of the accumulated travel distance data, at step S230 the accumulated travel distance outlier remover 320 calculates the value (now_val) of accumulated travel distance data of the current index (now_idx), the value (next_val) of accumulated travel distance data of the next index (next_idx), and a time difference (ts_dif) obtained by subtracting the time of accumulated travel distance data of the current index (now_idx) from the time of accumulated travel distance data of the next index (next_idx)

Then, at step S240, the accumulated travel distance outlier remover 320 determines whether a calculated travel distance (next_val−now_val) of the vehicle exceeds the maximum travel distance (1*ts_dif/14+1) available during the time difference (ts_dif) (i.e., next_val−now_val>1*s_dif/14+1), or whether the calculated travel distance (next_val−now_val) is smaller than 0 (i.e., next_val−now_val<0). Based on the vehicle's maximum speed of 260 km/h, it takes about 14 seconds to drive 1 km. In addition, considering that the unit of the accumulated travel distance data is kilometer and can increase by 1 after 1 second, the maximum travel distance with 1 added (1*ts_dif/14+1) is applied.

As a result of the determination at step S240, if the calculated travel distance (next_val−now_val) exceeds the maximum travel distance (1×ts_dif/14+1) available during the time difference (ts_dif) or is less than 0, the accumulated travel distance outlier remover 320 deletes the accumulated travel distance data of the corresponding index (next_idx) at step S250 and proceeds to step S260.

On the other hand, as a result of the determination at step S240, if the calculated travel distance (next_val−now_val) does not exceed the maximum travel distance (1*ts_dif/14+1) available during the calculated time difference (ts_dif) and is not less than 0, the accumulated travel distance outlier remover 320 increases the index by 1 at step S260 (i.e., now_idx=next_idx, next_ind+0.1).

Then, at step S220, the accumulated travel distance outlier remover 320 determines again whether the next index (next_idx) is greater than the length of the accumulated travel distance data based on the current accumulated travel distance data. If the next index (next_idx) is not greater than the length of the accumulated travel distance data, the accumulated travel distance outlier remover 320 repeats steps S230 to S260 described above, and if the next index (next_idx) is greater than the length of the accumulated travel distance data, the accumulated travel distance outlier remover 320 ends the process.

Figure 4:
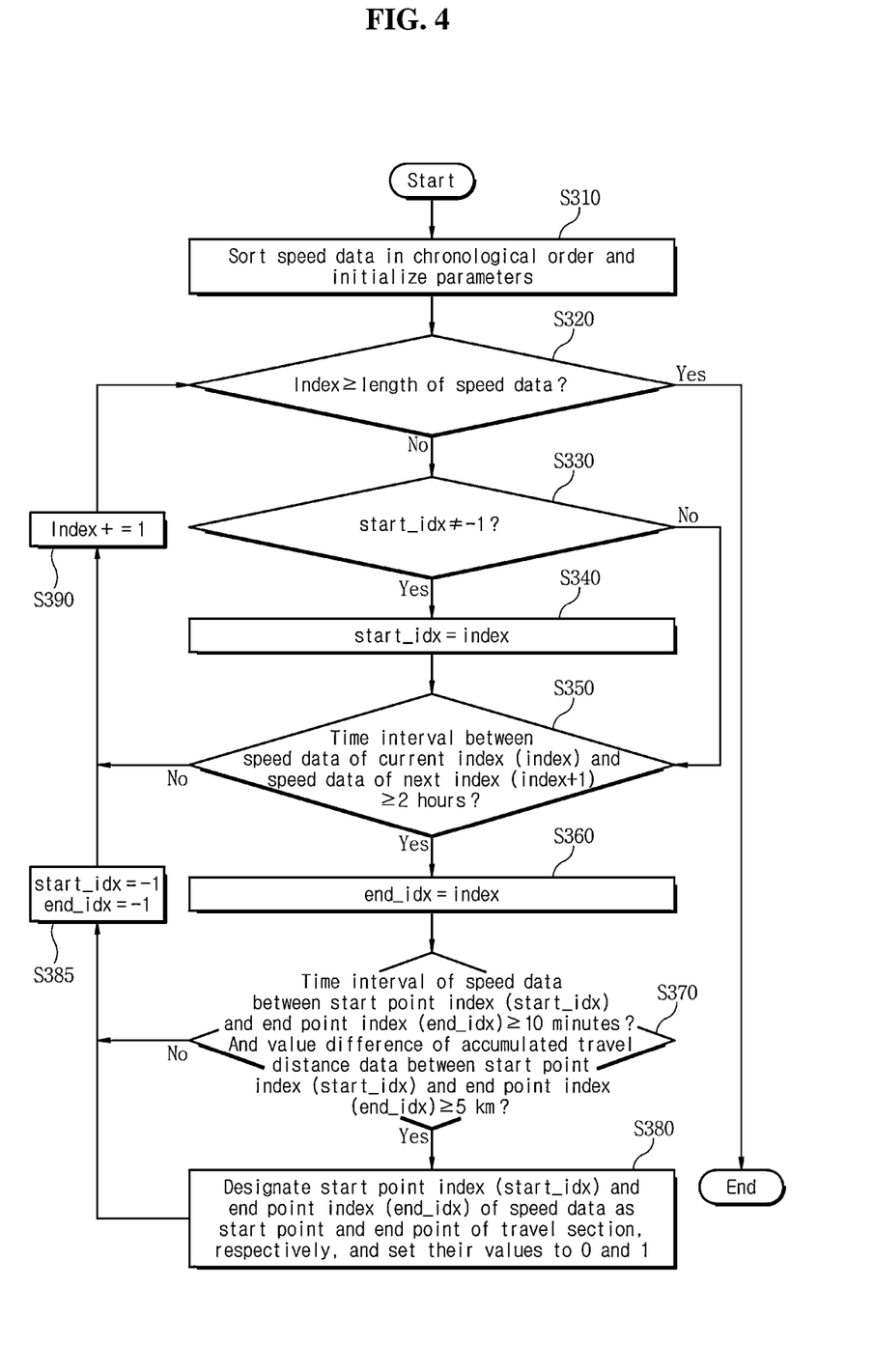
FIG. 4 is a flowchart illustrating a method of extracting a travel section at a travel section extractor according to an embodiment of the present invention.

Next, a method for the travel section extractor to extract a travel section according to an embodiment of the present invention will be described. FIG. 4 is a flowchart illustrating a method of extracting a travel section at a travel section extractor according to an embodiment of the present invention.

Referring to FIG. 4, it is assumed that outliers have been removed from the speed data. At step S310, the travel section extractor 400 sorts the speed data in chronological order and initializes parameters, that is, a start point index (start_idx), an end point index (end_idx), and an index. At this time, the start point index (start_idx) and the end point index (end_idx) are initialized to −1, and the index is initialized to 0 (i.e., index=0, start_idx=−1, end_idx=−1). Then, at step S320, the travel section extractor 400 determines whether the index of the current speed data is greater than or equal to the length of the speed data. If it is determined at step S320 that the index is smaller than the length of the speed data, the process proceeds to step S330. If it is determined at step S320 that the index is greater than or equal to the length of the speed data, the process is ended.

At step S330, the travel section extractor 400 determines whether the start point index (start_idx) is not −1. That is, at step S330, the travel section extractor 400 determines whether the start point of the travel section is designated.

If it is determined at step S330 that the start point of the travel section is not designated, that is, if the start point index (start_idx) is not −1, the travel section extractor 400 changes the value of the start point index (start_idx) to the current index at step S340 (i.e., start_idx=index). That is, at step S340, the travel section extractor 400 selects the current index (index) as the start point index (start_idx).

On the other hand, if it is determined at step S330 that the start point index (start_idx) is −1, that is, if the start point of the travel section is designated, the travel section extractor 400 proceeds to step S350.

Then, at step S350, the travel section extractor 400 determines whether a time interval between the speed data of the current index (index) and the speed data of the next index (index+1) is 2 hours or more. If it is determined at step S350 that the time interval between the speed data of the current index and the speed data of the next index is 2 hours or more, the travel section extractor 400 changes the value of the end point index (end_idx) to the current index at step S360 (i.e., end_idx=index). That is, at step S360, the travel section extractor 400 selects the current index as the end point index (end_idx).

On the other hand, if it is determined at step S350 that the time interval between the speed data of the current index and the speed data of the next index is less than 2 hours, the travel section extractor 400 proceeds to step S390 to increase the index by 1 (i.e., index+=1), and then repeats the above steps S320 to S350.

As described above, when the start point index (start_idx) is selected at step S340 and the end point index (end_idx) is selected at step S360, the travel section extractor 400 determines at step S370 whether a time interval of the speed data between the start point index (start_idx) and the end point index (end_idx) is greater than or equal to 10 minutes, and whether a difference (travel distance) of accumulated travel distance values between the start point index (start_idx) and the end point index (end_idx) is greater than or equal to 5 km.

If it is determined at step S370 that the time interval of the speed data between the start point index (start_idx) and the end point index (end_idx) is less than 10 minutes and that the difference (travel distance) of accumulated travel distance values between the start point index (start_idx) and the end point index (end_idx) is less than km, the travel section extractor 400 initializes each of the start point index (start_idx) and the end point index (end_idx) to −1 at step S385, proceeds to step S390 to increase the index by 1 (index+=1), and repeats the above-described steps S320 to S350.

On the other hand, if it is determined at step S370 that the time interval of the speed data between the start point index (start_idx) and the end point index (end_idx) is greater than or equal to 10 minutes and that the difference (travel distance) of accumulated travel distance values between the start point index (start_idx) and the end point index (end_idx) is greater than or equal to 5 km, the travel section extractor 400 designates the start point index (start_idx) and the end point index (end_idx) of the speed data as the start and end points of the travel section, respectively, at step S380, and sets their values to 0 and 1, respectively, to indicate the start and end points. As a result, derived travel section data includes travel section start point data, which is an array in which the start point of the travel section {time: 0} is stored, and travel section end point data, which is an array in which the end point of the travel section {time: 1} is stored.

Figure 5:
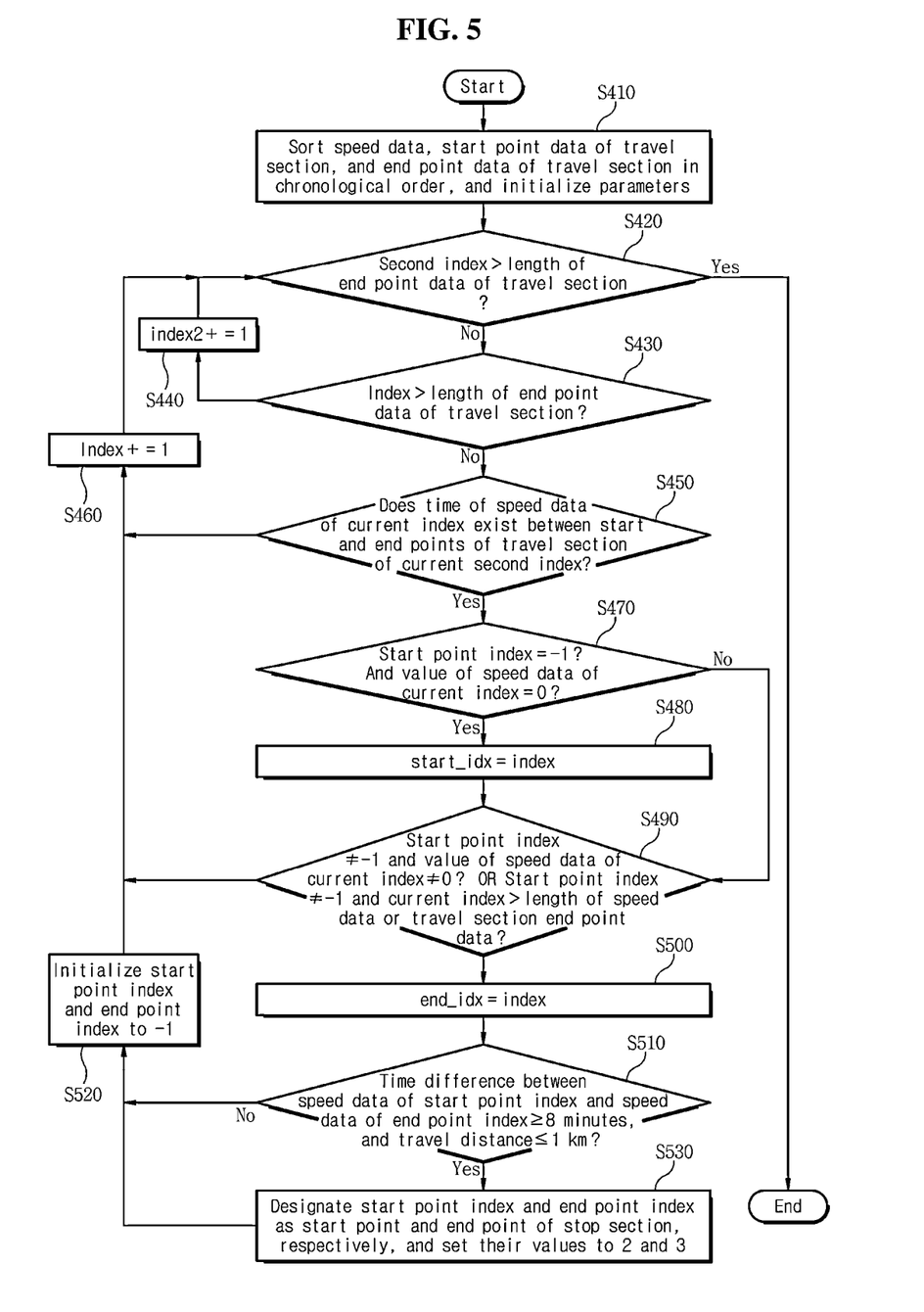
FIG. 5 is a flowchart illustrating a method of extracting a stop section based on speed at a speed-based stop section extractor according to an embodiment of the present invention.

Next, a method for the speed-based stop section extractor to extract a stop section based on speed according to an embodiment of the present invention will be described. FIG. 5 is a flowchart illustrating a method of extracting a stop section based on speed at a speed-based stop section extractor according to an embodiment of the present invention.

Referring to FIG. 5, at step S410, the speed-based stop section extractor 510 sorts the speed data, start point data of the travel section, and end point data of the travel section in chronological order, and initializes parameters, that is, a start point index (start_idx), an end point index (end_idx), an index (index), and a second index (index2). In FIG. 5, the start point index (start_idx) and the end point index (end_idx) are indexes indicating the start and end points of the stop section, respectively. In addition, the index (index) indicates the order of the speed data, and the second index (index2) indicates the order of start and end point data of the travel section. Here, the start and end point data of the travel section is data derived by the travel section extractor 400. In particular, the start point index (start_idx) and the end point index (end_idx) are initialized to −1, and the index (index) and the second index (index2) are initialized to 0.

At step S420, the speed-based stop section extractor 510 determines whether the second index (index2) exceeds the length of end point data of the travel section. If the second index (index2) exceeds the length of end point data of the travel section, the process is ended.

On the other hand, if the second index (index2) does not exceed the length of the end point data of the travel section, the speed-based stop section extractor 510 determines at step S430 whether the index exceeds the length of the end point data of the travel section.

If it is determined at step S430 that the index exceeds the length of the end point data of the travel section, the speed-based stop section extractor 510 increases the second index (i.e., index2+=1) at step S440, and then steps S420 and S430 are repeated.

On the other hand, if it is determined at step S430 that the index does not exceed the length of the end point data of the travel section, the speed-based stop section extractor 510 determines at step S450 whether the time of the speed data of the current index exists between the time of the start point data and the time of the end point data of the travel section of the current second index.

If it is determined at step S450 that the time of the speed data of the current index does not exist between the time of the start point data and the time of the end point data of the travel section of the current second index, the speed-based stop section extractor 510 proceeds to step S460 to increase the index (i.e., index+=1), and then proceeds to step S420.

On the other hand, if it is determined at step S450 that the time of the speed data of the current index exists between the time of the start point data and the time of the end point data of the travel section of the current second index, the speed-based stop section extractor 510 determines at step S470 whether the start index (start_index) is −1 and the value of the speed data of the current index is 0.

If it is determined at step S470 that the start point index (start_index) is not −1 or the value of the speed data of the current index is not 0, the speed-based stop section extractor 510 proceeds to step S490.

On the other hand, if it is determined at step S470 that the start index (start_index) is −1 and the value of the speed data of the current index is 0, the speed-based stop section extractor 510 changes the value of the start index (start_idx) to the current index (i.e., start_idx=index) at step S480. That is, at step S480, the speed-based stop section extractor 510 selects the current index (index) as the start point index (start_idx).

At step S490, the speed-based stop section extractor 510 determines whether the start point index (start_index) is not −1 and the value of the speed data of the current index (index) is not 0, or whether the start point index (start_index) is not −1 and the current index (index) exceeds the length of speed data or travel section end point data.

If it is determined at step S490 that the value of the speed data of the current index is 0 or the current index does not exceed the length of speed data or travel section end point data, the speed-based stop section extractor 510 proceeds to step S460 to increase the index (i.e., index+=1), and then proceeds to step S420.

On the other hand, if it is determined at step S490 that the start point index (start_index) is not −1 and the value of the speed data of the current index (index) is not 0, or the start point index (start_index) is not −1 and the current index (index) exceeds the length of speed data or travel section end point data, the speed-based stop section extractor 510 changes the value of the end point index (end_idx) to the current index (i.e., end_idx=index) at step S500. That is, at step S500, the speed-based stop section extractor 510 selects the current index (index) as the end point index (end_idx).

Next, at step S510, the speed-based stop section extractor 510 determines whether a time difference between the speed data of the start point index (start_idx) and the speed data of the end point index (end_idx) is greater than or equal to 8 minutes and the travel distance is smaller than or equal to 1 km.

If it is determined at step S510 that the time difference between the speed data of the start point index (start_idx) and the speed data of the end point index (end_idx) is smaller than 8 minutes or the travel distance is greater than 1 km, the speed-based stop section extractor 510 initializes the start point index (start_idx) and the end point index (end_idx) to −1 at step S520, proceeds to step S460 to increase the index (i.e., index+=1), and then proceeds to step S420.

On the other hand, if it is determined at step S510 that the time difference between the speed data of the start point index (start_idx) and the speed data of the end point index (end_idx) is greater than or equal to 8 minutes and the travel distance is smaller than or equal to 1 km, at step S530 the speed-based stop section extractor 510 designates the start point index (start_idx) and the end point index (end_idx) as the start and end points of the stop section, respectively, and sets their values to 2 and 3, respectively.

Figure 6:
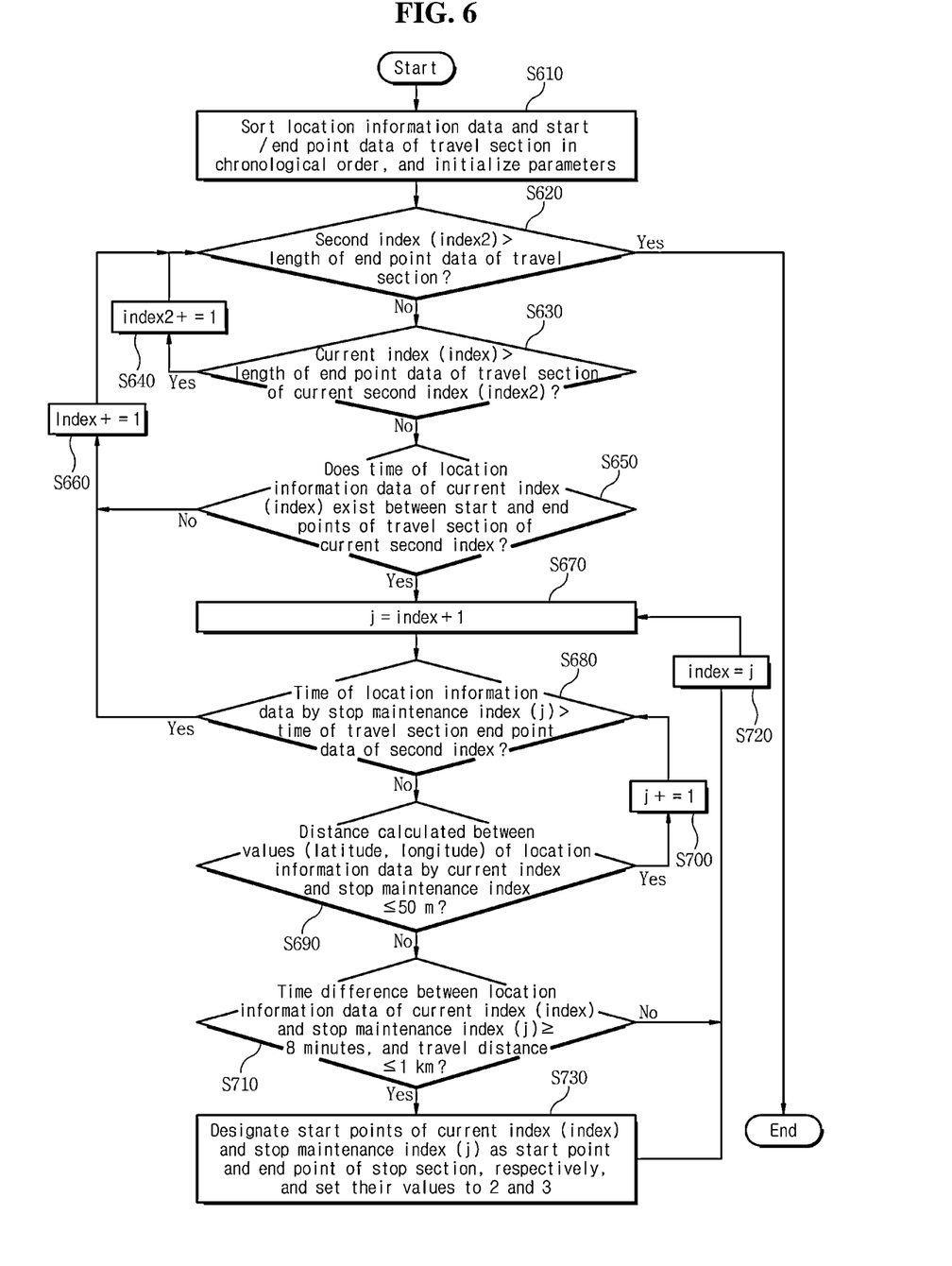
FIG. 6 is a flowchart illustrating a method of extracting a stop section based on location information at a GPS-based stop section extractor according to an embodiment of the present invention.

Next, a method for the GPS-based stop section extractor to extract a stop section based on location information according to an embodiment of the present invention will be described. FIG. 6 is a flowchart illustrating a method of extracting a stop section based on location information at a GPS-based stop section extractor according to an embodiment of the present invention.

Referring to FIG. 6, at step S610, the GPS-based stop section extractor 520 sorts the location information (latitude and longitude) data and the start and end point data of the travel section in chronological order, and initializes parameters, namely, a stop maintenance index (j), an index (index), and a second index (index2) to 0. Here, the location information data refers to location information including latitude and longitude extracted from GPS satellite signals. This location information data is an array in the form of {time: value(latitude, longitude)}. The index (index) indicates the order of the location information data, and the second index (index2) indicates the order of the start and end point data of the travel section. In addition, the stop maintenance index (j) indicates an index of the location information data whose location is maintained within 50 m from the location information data of the current index.

Next, at step S620, the GPS-based stop section extractor 520 determines whether the second index (index2) exceeds the length of end point data of the travel section. If the second index (index2) exceeds the length of end point data of the travel section, the process is ended.

On the other hand, if the second index (index2) does not exceed the length of the end point data of the travel section, the GPS-based stop section extractor 520 determines at step S630 whether the current index (index) exceeds the length of the end point data of the travel section of the current second index (index2).

If it is determined at step S630 that the current index (index) exceeds the length of the end point data of the travel section of the current second index (index2), the GPS-based stop section extractor 520 increases the second index (i.e., index2+=1) at step S640, and then proceeds to step S620.

On the other hand, if it is determined at step S630 that the current index (index) does not exceed the length of the end point data of the travel section of the current second index (index2), the GPS-based stop section extractor 520 determines at step S650 whether the time of the location information data of the current index (index) exists between the time of the start point data and the time of the end point data of the travel section of the current second index (index2).

If it is determined at step S650 that the time of the location information data of the current index (index) does not exist between the time of the start point data and the time of the end point data of the travel section of the current second index (index2), the GPS-based stop section extractor 520 increases the index (i.e., index+=1) at step S660 and then proceeds to step S620.

On the other hand, if it is determined at step S650 that the time of the location information data of the current index (index) exists between the time of the start point data and the time of the end point data of the travel section of the current second index (index2), the GPS-based stop section extractor 520 inputs a value obtained by increasing the current index by 1 to the stop maintenance index j (i.e., j=index+1) at step S670.

Next, at step S680, the GPS-based stop section extractor 520 determines whether the time of the location information data by the stop maintenance index (j) exceeds the time of the travel section end point data of the second index.

If it is determined at step S680 that the time of the location information data by the stop maintenance index (j) exceeds the time of the travel section end point data of the second index, the GPS-based stop section extractor 520 increases the index (index) at step S660 and proceeds to step S620.

On the other hand, if it is determined at step S680 that the time of the location information data by the stop maintenance index (j) does not exceed the time of the travel section end point data of the second index, the GPS-based stop section extractor 520 determines at step S690 whether a distance calculated between the values (latitude, longitude) of the location information data by the current index and the stop maintenance index is smaller than or equal to 50 m.

If it is determined at step S690 as 50 m or less, the GPS-based stop section extractor 520 proceeds to step S700 to increase the stop maintenance index j (i.e., j+=1), and then proceeds to step S680.

On the other hand, if it is determined at step S690 that the calculated distance exceeds 50 m, the GPS-based stop section extractor 520 determines at step S710 whether a time difference between the location information data of the current index (index) and the stop maintenance index (j) is greater than or equal to 8 minutes and whether the travel distance is smaller than or equal to 1 km.

If it is determined at step S710 that the time difference between the location information data of the current index (index) and the stop maintenance index (j) are smaller than 8 minutes or the travel distance is smaller than 1 km, the GPS-based stop section extractor 520 proceeds to step S720 to set the current index (index) as the stop maintenance index (j) (i.e., index=j), and then proceeds to step S670.

On the other hand, if the time difference between the location information data of the current index (index) and the stop maintenance index (j) is 8 minutes or more, and the travel distance is 1 km or less, at step S730 the GPS-based stop section extractor 520 designates the start points of the current index (index) and the stop maintenance index (j) as the start and end points of the stop section, respectively, and sets their values to 2 and 3, respectively.

Figure 7:
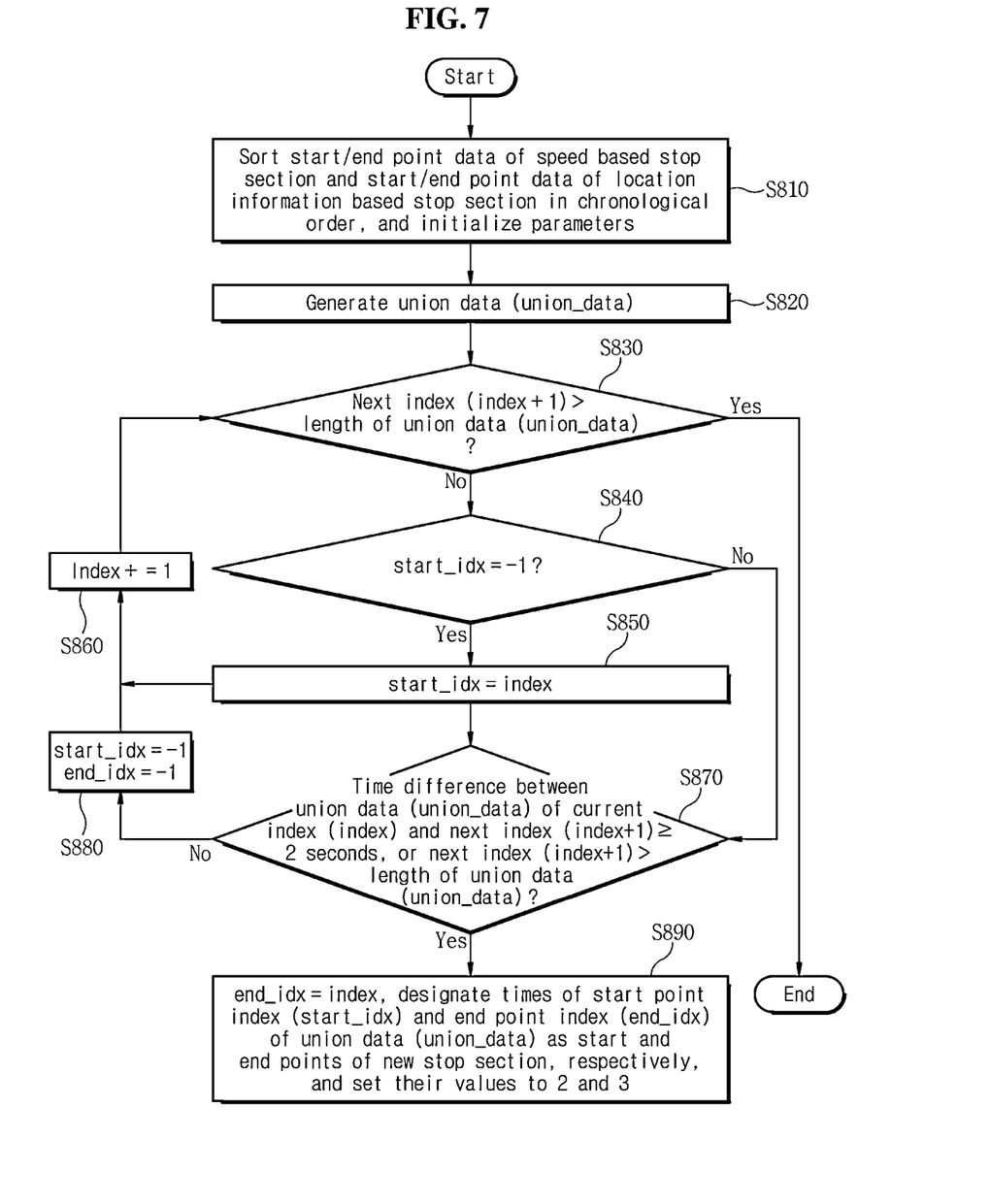
FIG. 7 is a flowchart illustrating a method of extracting a stop section based on speed and location information at a speed-and-GPS-based stop section extractor according to an embodiment of the present invention.

Next, a method for the speed-and-GPS-based stop section extractor to extract a stop section based on both speed and location information according to an embodiment of the present invention will be described. FIG. 7 is a flowchart illustrating a method of extracting a stop section based on speed and location information at a speed-and-GPS-based stop section extractor according to an embodiment of the present invention.

Referring to FIG. 7, at step S810, the speed-and-GPS-based stop section extractor 530 sorts the start and end point data of the stop section based on speed and the start and end point data of the stop section based on the location information in chronological order, and initializes parameters. Here, the parameters include an index (index), a start point index (start_idx), and an end point index (end_dix). The index (index) indicates an array order of the union of the start and end point data of the speed-based stop section and the start and end point data of the location-information-based stop section. In addition, the start point index (start_idx) indicates an index of the start point of the stop section based on speed and location information, and the end point index (end_dix) indicates an index of the end point of the stop section based on speed and location information. Also, the index (index) is initialized to 0, and the start point index (start_idx) and the end point index (end_dix) are initialized to −1.

Next, at step S820, the speed-and-GPS-based stop section extractor 530 generates union data (union_data) by filling in the form of {time:1} every second between all start and end points of the speed-based stop section and the location-based stop section and then combining the data of the speed-based stop section and the data of the location-based stop section (i.e., union_data=combination of data strings of stop sections based on speed and GPS and filled with values).

Next, at step S830, the speed-and-GPS-based stop section extractor 530 determines whether the next index (index+1) exceeds the length of the union data (union_data).

If it is determined at step S830 that the next index (index+1) exceeds the length of the union data (union_data), the speed-and-GPS-based stop section extractor 530 ends the process.

On the other hand, if it is determined at step S830 that the next index (index+1) does not exceed the length of the union data (union_data), the speed-and-GPS-based stop section extractor 530 determines at step S840 whether the start point index (start_idx) is −1.

If it is determined at step S840 that the start point index (start_idx) is not −1, the speed-and-GPS-based stop section extractor 530 proceeds to step S870.

On the other hand, if it is determined at step S840 that the start point index (start_idx) is −1, the speed-and-GPS-based stop section extractor 530 proceeds to step S850 to set the current index as the start point index (i.e., start_idx=index). That is, after designating the current index (index) as the start point of a new stop section, it increases the index at step S860 (i.e., index+=1), and then proceeds to step S830. Meanwhile, at step S870, the speed-and-GPS-based stop section extractor 530 determines whether a time difference between the union data (union_data) of the current index (index) and the next index (index+1) is 2 seconds or more, or whether the next index (index+1) exceeds the length of the union data (union_data).

If it is determined at step S870 that the time difference between the union data (union_data) of the current index (index) and the next index (index+1) is less than 2 seconds, and the next index (index+1) does not exceed the union data (union_data), the speed-and-GPS-based stop section extractor 530 initializes the start point index (start_idx) and the end point index (end_idx) to −1 at step S880, then increases the index at step S860 (i.e., index+=1), and proceeds to step S830.

On the other hand, if it is determined at step S870 that the time difference between the union data (union_data) of the current index (index) and the next index (index+1) is 2 seconds or more, or the next index (index+1) exceeds the union data (union_data), the speed-and-GPS-based stop section extractor 530 sets the end point index (end_idx) as the current index at step S890 (i.e., end_idx=index).

That is, it designates the current index as the end point of the new stop section, designates the start index (start_idx) time and end index (end_idx) time of the union data (union_data) as the start and end points of the new stop section, respectively, and sets their values to 2 and 3, respectively.

Figure 8:
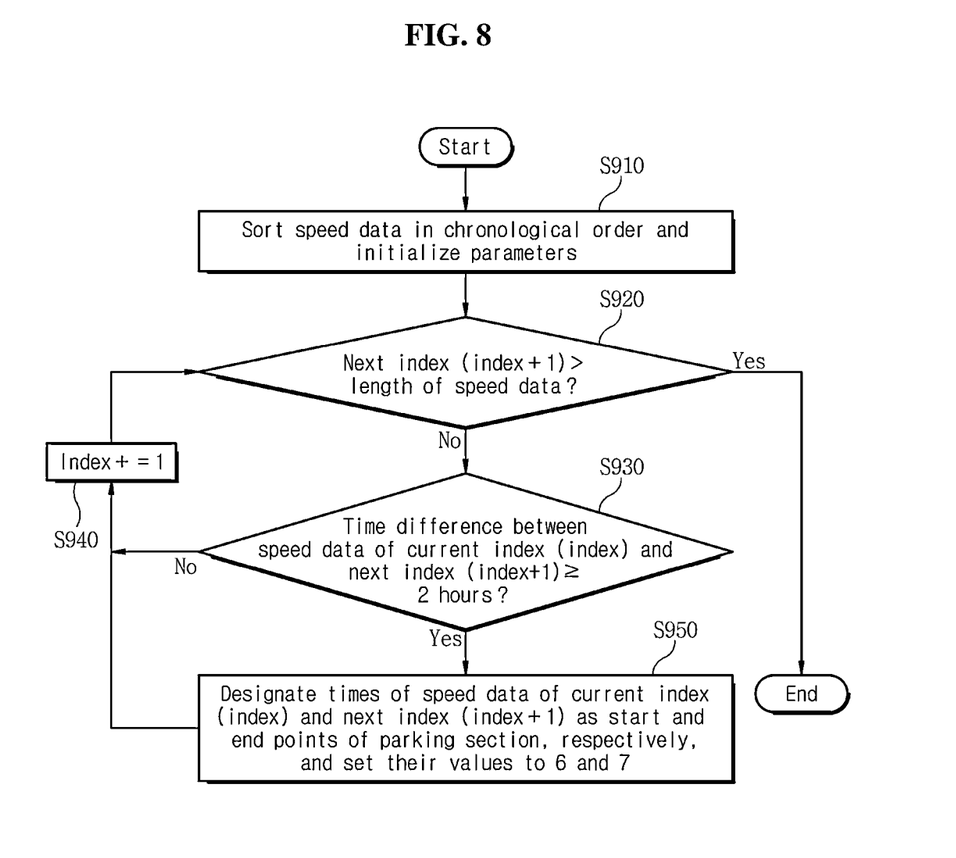
FIG. 8 is a flowchart illustrating a method of extracting a parking section at a parking section extractor according to an embodiment of the present invention.

Next, a method for the parking section extractor to extract a parking section according to an embodiment of the present invention will be described. FIG. 8 is a flowchart illustrating a method of extracting a parking section at a parking section extractor according to an embodiment of the present invention.

Referring to FIG. 8, at step S910, the parking section extractor 600 sorts the speed data in chronological order and initializes parameters. Here, the parameters include a start point index (start_idx), an end point index (end_idx), and an index (index). The index (index) indicates the order of the speed data. The start point index (start_idx) and the end point index (end_idx) are initialized to −1, and the index (index) is initialized to 0 (i.e., index=0, start_idx=−1, end_idx=−1).

At step S920, the parking section extractor 600 determines whether the next index (index+1) exceeds the length of the speed data.

If it is determined at step S920 that the next index (index+1) exceeds the length of the speed data, the parking section extractor 600 ends the process.

On the other hand, if it is determined at step S920 that the next index (index+1) does not exceed the length of the speed data, the parking section extractor 600 determines at step S930 whether a time difference between the speed data of the current index (index) and the speed data of the next index (index+1) is 2 hours or more.

If it is determined at step S930 that the time difference between the speed data of the current index (index) and the speed data of the next index (index+1) is less than 2 hours, the parking section extractor 600 increases the index at step S940 (i.e., index+=1), and then proceeds to step S920.

On the other hand, if it is determined at step S930 that the time difference between the speed data of the current index (index) and the speed data of the next index (index+1) is 2 hours or more, at step S950 the parking section extractor 600 designates the time of the speed data of the current index (index) and the time of the speed data of the next index (index+1) as the start and end points of the parking section, respectively, and sets their values to 6 and 7, respectively.

Figure 9:
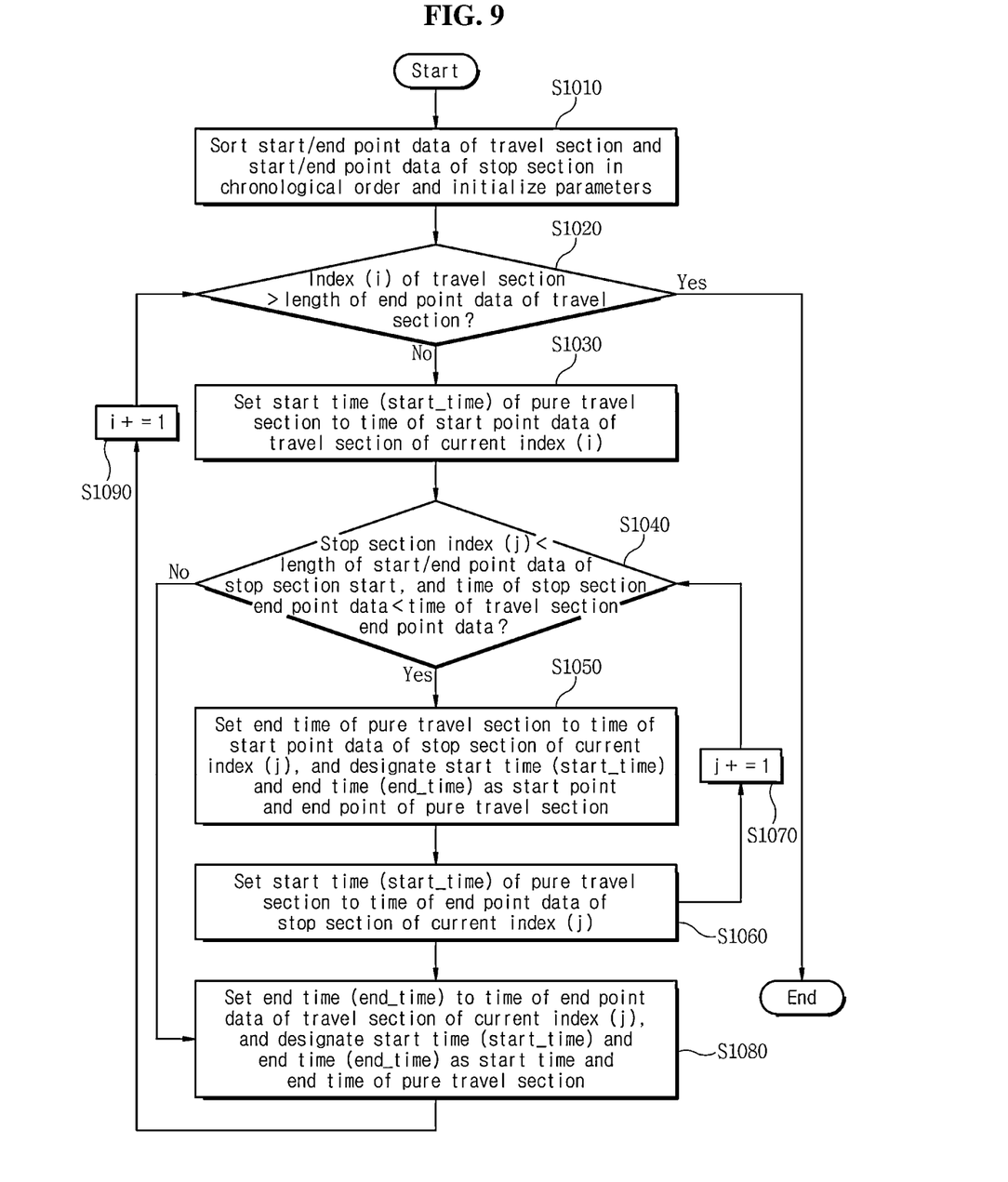
FIG. 9 is a flowchart illustrating a method of extracting a pure travel section at a pure travel section extractor according to an embodiment of the present invention.

Next, a method for the pure travel section extractor to extract a pure travel section according to an embodiment of the present invention will be described. FIG. 9 is a flowchart illustrating a method of extracting a pure travel section at a pure travel section extractor according to an embodiment of the present invention.

Referring to FIG. 9, at step S1010, the pure travel section extractor 700 sorts the start and end point data of the travel section and the start and end point data of the stop section in chronological order and initializes parameters. Here, the parameters include a travel section index (i), a stop section index (j), a start time (start_time) and end time (end_time) of the pure travel section, all of which are initialized to 0.

Next, at step S1020, the pure travel section extractor 700 determines whether the travel section index (i) exceeds the length of the travel section end point data.

If it is determined at step S1020 that the travel section index (i) exceeds the length of the travel section end point data, the pure travel section extractor 700 ends the process.

On the other hand, if it is determined at step S1020 that the travel section index (i) does not exceed the length of the travel section end point data, the pure travel section extractor 700 sets the start time (start_time) of the pure travel section to the time of the start point data of the travel section of the current index (i).

Next, at step S1040, the pure travel section extractor 700 determines whether the stop section index (j) is smaller than the length of the start and end point data of the step section and the time of the end point data of the stop section is smaller than the time of the end point data of the travel section.

If it is determined at S1040 that the stop section index (j) is smaller than the length of the stop section start and end point data and the time of the stop section end point data is smaller than the time of the travel section end point data, at step S1050 the pure travel section extractor 700 sets the end point time of the pure travel section to the time of the stop section point data of the current index (j), and sets the start time (start_time) and the end time (end_time) to the start and end points of the pure travel section, respectively. Then, at step S1060, the pure travel section extractor 700 sets the start time (start_time) of a pure travel section, which follows the pure travel section previously set at step S1050, to the time of the stop section end point data of the current index (j). Then, the pure travel section extractor 700 proceeds to step S1070 to increase the stop section index j (i.e., j+=1), and then proceeds to step S1040.

On the other hand, if it is determined at step S1040 that the stop section index (j) is greater than the length of the stop section start and end data, or the time of the stop section end data is greater than the time of the travel section end data, the pure travel section extractor 700 proceeds to step S1080.

At step S1080, the pure travel section extractor 700 sets the end time (end_time) as the time of the end point data of the travel section of the current index (j), and designates the start time (start_time) and the end point time (end_time) as the start time and end time of the pure travel section, respectively. Then, the pure travel section extractor 700 increases the travel section index (i) at step S1090 (i.e., i+=1) and then proceeds to step S1020.

The method according to embodiments of the present invention may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure may be easily deduced or altered by programmers in the art to which the present invention belongs.

Although embodiments of the present invention are described above, these embodiments are exemplary only and not construed as a limitation. Various changes and modifications to the present invention and their equivalents can be made as well understood by those skilled in the art without departing from the technical subject matter of the present invention and the scope of appended claims.

The invention claimed is:

1. A device for extracting operation information of a connected car, the device comprising:
   a speed outlier remover configured to remove speed outliers from speed data obtained by measuring a speed of a vehicle at first predetermined time intervals, wherein the speed data comprises an array of data in the form of a time and a speed obtained during the first predetermined time intervals;
   an accumulated travel distance outlier remover configured to remove distance outliers from accumulated travel section data obtained by accumulating a travel section of the vehicle at second predetermined time intervals, wherein the accumulated travel section data comprises an array of data in the form of a time and an accumulated travel distance obtained during the second predetermined time intervals;
   a travel section extractor configured to extract the travel section of the vehicle based on the speed data and the accumulated travel section data from which the speed outliers are removed by the speed outlier remover and the distance outliers are removed by the accumulated travel distance outlier remover;
   a stop section extractor configured to extract a stop section in which the vehicle is stopped; and
   a pure travel section extractor configured to extract a pure travel section which is obtained by excluding the stop section existing in the travel section from the travel section,
   the speed outlier remover configured to:
      sort the speed data in a chronological order,
      determine that a portion of the speed data obtained during a time interval of the first predetermined time intervals is beyond a maximum vehicle speed, and
      remove the portion of the speed data as the speed outliers, and the accumulated travel distance outlier remover configured to:
      sort the accumulated travel section data, comprising a plurality of accumulated travel distances, in a chronological order,
      determine a first accumulated travel distance obtained during a time interval of the second predetermined time intervals,
      determine a second accumulated travel distance obtained during a subsequent time interval of the second predetermined time intervals,
      determine a time difference between the time interval and the subsequent time interval of the second predetermined time intervals,
      derive a travel distance from a difference between the first and second accumulated travel distances,
      determine that the travel distance exceeds a maximum travel distance of the vehicle available during the time difference, and
      remove accumulated travel distance data associated with the second accumulated travel distance obtained during the subsequent time interval as the distance outliers.

2. The device of claim 1, wherein the travel section extractor is configured to designate a time point at which the speed data begins to exist as a start point of the travel section, and designate a time point at which no speed data begins to exist as an end point of the travel section, wherein when a time from the start point of the travel section to the end point of the travel section is equal to or greater than a predetermined time, and a distance from the start point of the travel section to the end point of the travel section is equal to or greater than a predetermined distance, the travel section is designated as a valid travel section.

3. The device of claim 1, wherein the stop section extractor includes at least one of:
   a speed-based stop section extractor configured to designate, as the stop section, a section where a speed of the vehicle is 0 for a predetermined time or more within the travel section;
   a GPS-based stop section extractor configured to designate, as the stop section between start and end points of the travel section, a section where a distance between pieces of location information of the vehicle is continuously within a predetermined distance; or
   a speed-and-GPS-based stop section extractor configured to detect the stop section by combining the designated stop section based on the speed and the designated stop section based on the location information.

4. The device of claim 1, further comprising:
   a parking section extractor configured to search for speed data from which the outliers are removed, and in response to an interval between consecutive speed data being a predetermined time or more, extract a parking section by designating start and end points of the parking section from the interval.

5. A method for extracting operation information of a connected car, the method comprising:
   at a speed outlier remover, removing speed outliers from speed data obtained by measuring a speed of a vehicle at first predetermined time intervals, wherein the speed data comprises an array of data in the form of a time and a speed obtained during the first predetermined time intervals;
   at an accumulated travel distance outlier remover, removing distance outliers from accumulated travel section data obtained by accumulating a travel section of the vehicle at second predetermined time intervals, wherein the accumulated travel section data comprises an array of data in the form of a time and an accumulated travel distance obtained during the second predetermined time intervals;
   at a travel section extractor, extracting the travel section of the vehicle based on the speed data and the accumulated travel section data from which the speed outliers are removed by the speed outlier remover and the distance outliers are removed by the accumulated travel distance outlier remover;
   at a stop section extractor, extracting a stop section in which the vehicle is stopped;-and
   at a pure travel section extractor, extracting a pure travel section which is obtained by excluding the stop section existing in the travel section from the travel section;

at the speed outlier remover:
  sorting the speed data in a chronological order,
  determining that a portion of the speed data obtained during a time interval of the first predetermined time intervals is beyond a maximum vehicle speed, and
  removing the portion of the speed data as the speed outliers; and
at the accumulated travel distance outlier remover:
  sorting the accumulated travel section data, comprising a plurality of accumulated travel distances, in a chronological order,
  determining a first accumulated travel distance obtained during a time interval of the second predetermined time intervals,
  determining a second accumulated travel distance obtained during a subsequent time interval of the second predetermined time intervals,
  determining a time difference between the time interval and the subsequent time interval of the second predetermined time intervals,
  deriving a travel distance from a difference between the first and second accumulated travel distances,
  determining that the travel distance exceeds a maximum travel distance of the vehicle available during the time difference, and
  removing accumulated travel distance data associated with the second accumulated travel distance obtained during the subsequent time interval as the distance outliers.

* * * * *